(12) United States Patent
Miyake et al.

(10) Patent No.: US 7,680,141 B2
(45) Date of Patent: Mar. 16, 2010

(54) TRANSMITTER DEVICE AND RELAY DEVICE FOR PERFORMING DATA TRANSMISSION CONTROL

(75) Inventors: Motoharu Miyake, Yokosuka (JP); Hiroshi Inamura, Yokohama (JP); Katsumi Sekiguchi, Yokosuka (JP); Makoto Jinguuji, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1390 days.

(21) Appl. No.: 11/024,255

(22) Filed: Dec. 23, 2004

(65) Prior Publication Data

US 2005/0165923 A1    Jul. 28, 2005

(30) Foreign Application Priority Data

Dec. 26, 2003 (JP) ............... 2003-433505
Dec. 26, 2003 (JP) ............... 2003-433506

(51) Int. Cl.
*H04L 12/54* (2006.01)
*H04L 12/28* (2006.01)
*H04B 7/00* (2006.01)
*G06F 15/173* (2006.01)

(52) U.S. Cl. .............. 370/428; 370/235; 370/338; 370/352; 370/445; 370/463; 455/502; 709/223; 709/226

(58) Field of Classification Search ......... 370/229–503; 709/223–226; 455/452, 502, 517
See application file for complete search history.

(56) References Cited

U.S. PATENT DOCUMENTS

| | | | |
|---|---|---|---|
| 5,392,286 A * | 2/1995 | Tanaka et al. .......... | 370/231 |
| 5,668,880 A * | 9/1997 | Alajajian ............. | 370/342 |
| 5,717,689 A * | 2/1998 | Ayanoglu ............. | 370/349 |
| 5,982,760 A * | 11/1999 | Chen ................. | 370/335 |
| 6,240,083 B1 * | 5/2001 | Wright et al. .......... | 370/348 |
| 6,463,477 B1 * | 10/2002 | Fontenot ............. | 709/236 |
| 6,473,793 B1 * | 10/2002 | Dillon et al. ......... | 709/223 |
| 6,590,885 B1 * | 7/2003 | Jorgensen ............ | 370/338 |
| 6,640,248 B1 * | 10/2003 | Jorgensen ............ | 709/226 |
| 6,643,292 B2 * | 11/2003 | Chapman et al. ....... | 370/395.52 |
| 6,987,738 B2 * | 1/2006 | Subramanian et al. ... | 370/252 |
| 7,085,229 B1 * | 8/2006 | Potter et al. ......... | 370/231 |

(Continued)

FOREIGN PATENT DOCUMENTS

EP    0 871 306 A2    10/1998

(Continued)

OTHER PUBLICATIONS

Andrew S. Tanenbaum, "The Transport Layer," Computer Networks, London: Prentice-Hall, 1996, pp. 536-542.

(Continued)

*Primary Examiner*—Ayaz R Sheikh
*Assistant Examiner*—Venkatesh Haliyur
(74) *Attorney, Agent, or Firm*—Brinks Hofer Gilson & Lione

(57) ABSTRACT

A transmitter device which performs window control in transmitting data for transmission through a communication network is caused to identify a mode of window control to be performed based on a communication condition under which the data transmission is performed, so as to transmit the data for transmission by performing the window control in the identified mode.

18 Claims, 10 Drawing Sheets

U.S. PATENT DOCUMENTS

| | | | |
|---|---|---|---|
| 7,113,085 B2 * | 9/2006 | Havekost | 340/506 |
| 7,155,502 B1 * | 12/2006 | Galloway et al. | 709/223 |
| 7,209,466 B2 * | 4/2007 | Cabana | 370/338 |
| 7,225,260 B2 * | 5/2007 | Herrod | 709/227 |
| 7,239,879 B2 * | 7/2007 | Avidor et al. | 455/456.5 |
| 7,251,218 B2 * | 7/2007 | Jorgensen | 370/235 |
| 7,296,288 B1 * | 11/2007 | Hill et al. | 726/2 |
| 7,324,447 B1 * | 1/2008 | Morford | 370/231 |
| 7,343,619 B2 * | 3/2008 | Ofek et al. | 726/2 |
| 7,397,764 B2 * | 7/2008 | Cherian et al. | 370/235 |
| 7,433,304 B1 * | 10/2008 | Galloway et al. | 370/229 |
| 2002/0089927 A1 * | 7/2002 | Fischer et al. | 370/229 |
| 2003/0103521 A1 * | 6/2003 | Raphaeli et al. | 370/445 |
| 2003/0163787 A1 * | 8/2003 | Hay et al. | 715/522 |
| 2003/0174700 A1 * | 9/2003 | Ofek et al. | 370/389 |
| 2003/0177381 A1 * | 9/2003 | Ofek et al. | 713/200 |
| 2003/0177391 A1 * | 9/2003 | Ofek et al. | 713/201 |
| 2004/0043783 A1 * | 3/2004 | Anderson | 455/522 |
| 2004/0141523 A1 * | 7/2004 | Bhushan et al. | 370/469 |
| 2004/0141525 A1 * | 7/2004 | Bhushan et al. | 370/473 |
| 2004/0190540 A1 * | 9/2004 | Miyake et al. | 370/428 |
| 2005/0063458 A1 * | 3/2005 | Miyake et al. | 375/235 |
| 2005/0068911 A1 * | 3/2005 | Miyake et al. | 370/299 |
| 2005/0083907 A1 * | 4/2005 | Fishler | 370/352 |
| 2007/0197162 A1 * | 8/2007 | Koizumi et al. | 455/11.1 |

FOREIGN PATENT DOCUMENTS

| | | |
|---|---|---|
| EP | 1507370 A2 * | 2/2005 |
| JP | 08-331164 A | 12/1996 |
| JP | 2000-278320 | 10/2000 |
| JP | 2002335278 A * | 11/2002 |
| WO | WO 01/93513 A2 | 12/2001 |

OTHER PUBLICATIONS

I. Miloucheva, et al., "Protocol Mechanisms for Reliable Transmission and Flow Control on Multimedia Highways," Conference Proceedings of the 1996 IEEE Fifteenth Annual International Phoenix Conference on Computers and Communications, New York: IEEE, 1996, pp. 239-245.

M. Allman, et al., "Increasing TCP's Initial Window," RFC3390, Internet Engineering Task Force, Oct. 2002.

Office Action mailed Jul. 29, 2008 in Japanese Patent Application No. 2003-433505, Serial No. 2003P06262, with English language translation, 4 pgs.

Office Action mailed Mar. 11, 2009 in European Patent Application No. 04 029 846.5, 5 pgs.

* cited by examiner

| TYPE IDENTIFIER | CONTROL PARAMETER |
|---|---|
| 192.1.1.1~192.1.1.255 | 6 |
| 192.1.2.1~192.1.2.255 | 3 |

| TRANSMITTER IDENTIFIER | CONTROL PARAMETER |
|---|---|
| ADDRESS OF TRANSMITTER DEVICE 350A | 6 |
| ADDRESS OF TRANSMITTER DEVICE 350B | 3 |

| DATA AMOUNT FOR TRANSMISSION | CONTROL PARAMETER |
|---|---|
| EQUAL TO OR LARGER THAN 50 Kbytes | 3 |
| SMALLER THAN 50 Kbytes | 10 |

TRANSMITTER DEVICE AND RELAY DEVICE FOR PERFORMING DATA TRANSMISSION CONTROL

BACKGROUND

This application claims priority under 35 U.S.C. §119 to Japanese Patent Application Nos. 2003-433505 and 2003-433506 both filed Dec. 26, 2003, the entire contents of which are hereby incorporated herein by reference.

1. Technical Field

The present invention relates to data communication performed with a communication terminal.

2. Background Information

Mobile phones having a browsing function are now widely used. Use of such phones allows a user to access a content server on the Internet and to view and download content from the server to the phone. Such mobile phones conform to either the 3G (Third-Generation) system using a W-CDMA (Wideband Code Division Multiple Access) or CDMA 2000 (Code Division Multiple Access 2000) system, or to the 2G (Second-Generation) system phones using a PDC (Personal Digital Cellular) system. Data transmission conducted using the 3G system is faster than that of the 2G system. Given that mobile phones (hereinafter, communication terminals) offer different transmission rates depending on a communication system employed by a particular terminal, if communication is performed at a transmission rate best suited to a particular communication terminal, it is likely that efficiency of data transmission for another communication terminal will be compromised.

JP 2000-278320 proposes a system for solving such a problem. Using the system, a communication terminal which receives data transmitted from a transmitter device enables an operation to be performed that ensures that data communication is conducted in an appropriate mode. Specifically, by using such a system a communication terminal is caused to measure a round trip time from when a communication message (Syn packet) requesting a start of communication is transmitted to a transmitter device until a response message (SynAck packet) is received. The communication terminal at which the data is received then estimates a communication bandwidth available in a communication path between the transmitter device, and on the basis of this determination an appropriate operation mode is employed for a communication application such as a browser. Further, the communication terminal obtains from routers on the communication path a transfer time for data transmitted between the routers, and relay devices located at each end of a link to which the decided operation mode is notified, there existing in the link a significant difference between an upload transmission rate and a download transmission rate. Consequently, the relay devices are able to set communication parameters that are optimal for the operation mode.

However, the technique disclosed in JP 2000-278320 is not necessarily effective, especially when it is applied to a communication environment such as a mobile communication network having a wireless zone where a communication state is usually unstable. In other words, a round trip time measured since transmission of a first Syn packet till receipt of a Syn-Ack packet cannot be relied upon as a basis for determining an optimal operation mode.

SUMMARY OF INVENTION

The present invention has been made with a view to solving the problem stated above, and it aims to provide a system for enabling a transmitter device to perform optimal data transmission dependent on a communication condition, which system is reliable and effective when it is applied to any communication environment.

In one aspect, the present invention provides a transmitter device comprising: transmission data storing means for storing data for transmission; control parameter storing means for storing a control parameter in correspondence with a communication condition pertaining to data transmission, the control parameter defining a mode of window control to be performed when transmitting in the communication condition the data for transmission through a communication network to a receiving communication terminal; first detection means for detecting a communication condition of data transmission under which the data for transmission is to be transmitted prior to initiation of the data transmission; transmission means for transmitting through the communication network the data for transmission to the receiving communication terminal; and transmission control means for controlling the transmission means to perform window control in a mode defined by a control parameter identified on the basis of the communication condition detected by the first detection means and a memory content in the control parameter storing means.

In another aspect, the present invention provides a relay device comprising: first control parameter storing means for storing a control parameter in correspondence with a communication condition pertaining to data transmission, the control parameter defining a mode of window control to be performed when data for transmission is transmitted in the communication condition through a communication network to a receiving communication terminal; detection means for detecting a communication condition of data transmission under which the data for transmission is to be transmitted; identifying means for identifying a control parameter on the basis of the communication condition detected by the detection means and a memory content in the first control parameter storing means; transfer means for transferring the data for transmission transmitted from a transmitter device to the receiving communication terminal; and control means for controlling the transmitter device or the transfer means to transmit the data for transmission in a mode defined by the control parameter identified by the identifying means.

The control parameter is data affecting a transmission rate for transmitting the data for transmission to the receiving communication terminal. The communication condition is defined by, for example, a type of a receiving communication terminal, an amount of data for transmission, or the like.

In still another aspect, the present invention provides a program product for causing a general computer device to execute the process performed by the transmitter device or the relay device, as well as a computer device readable recording medium which stores the program.

According to the present invention, data transmission can be effectively performed in a mode best suited to a condition pertaining to transmission in any type of communication network.

DETAILED DESCRIPTION OF THE PREFERRED EMBODIMENTS

In the following, description will be given of preferred embodiments of the present invention with reference to the attached drawings.

A: First Embodiment

A-1: Configuration of Communication System

Figure 1:
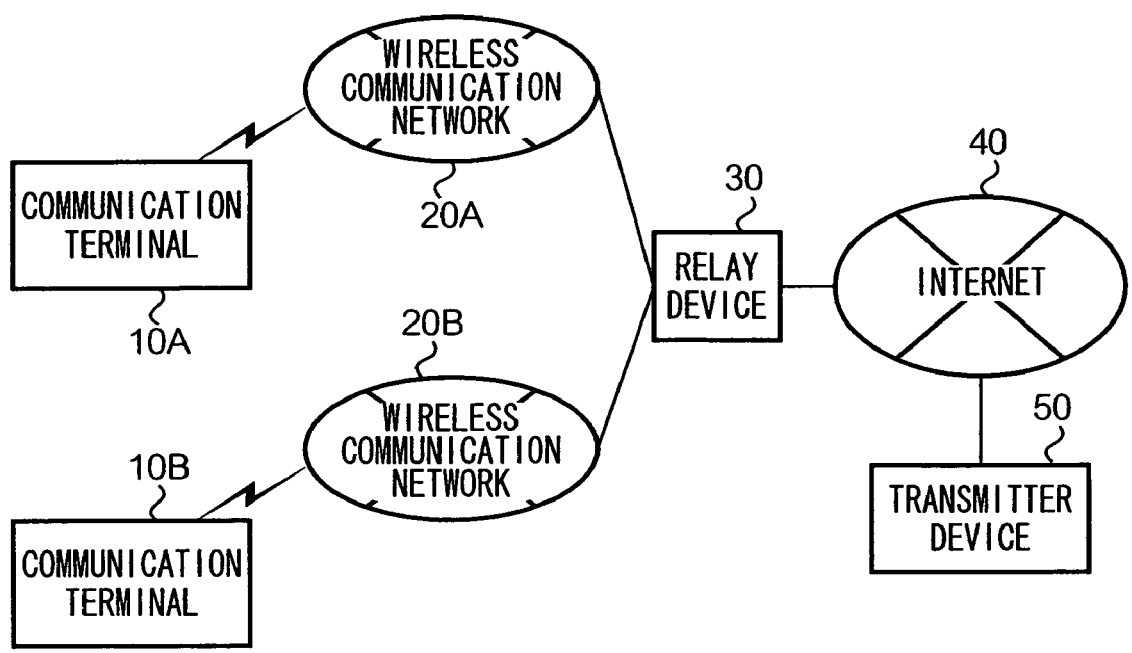
FIG. 1 is a diagram showing an example of a configuration of a communication system according to a first embodiment of the present invention.

FIG. 1 is a diagram showing an example of a configuration of a first embodiment of the present invention. Communication terminals 10A and 10B are mobile phones, each of which employs a different communication system, and each of which is provided with a browser function. Specifically, communication terminal 10A is a W-CDMA-system mobile phone; and communication terminal 10B is a PDC-system mobile phone. Hereinafter, communication terminals 10A and 10B will be collectively referred to as communication terminal 10 unless otherwise stated. While FIG. 1 shows one W-CDMA-system mobile phone (i.e., communication terminal 10A) and one PDC-system mobile phone (i.e., communication terminal 10B), in actuality there are a plurality of W-CDMA-system mobile phones and a plurality of PDC-system mobile phones. Each of the plurality of mobile phones shown in FIG. 1 is assigned a unique communication address (e.g. an IP address), such that a range of communication addresses assigned to W-CDMA-system mobile phones do not overlap a range of communication addresses assigned to PDC-system mobile phones. Specifically, a range of communication addresses assigned to W-CDMA-system mobile phones are "192.1.1.1-192.1.1.255"; and a range of those assigned to PDC-system mobile phones are "192.1.2.1-192.1.2.255". In the present embodiment, communication terminal 10 is a mobile phone either employing a W-CDMA system or a PDC system and having a browser function, but can be a PHS (Personal Handyphone System®), a PDA (Personal Digital Assistant), or a mobile personal computer (hereinafter, PC) so long as a browser function is provided.

A wireless communication network 20A shown in FIG. 1 is a W-CDMA-system wireless communication network and serves W-CDMA-system mobile phones located in a service area that it covers, so as to provide a wireless communication service. A wireless communication network 20B is a PDC-system wireless communication network and serves PDC-system mobile phones located in a service area that it covers, so as to provide a wireless communication service. In the following, wireless communication networks 20A and 20B are collectively referred to as "wireless communication network 20" unless otherwise stated.

A relay device 30 in FIG. 1 is, for example, a gateway device, and is connected to wireless communication networks 20A and 20B, and the Internet 40. Relay device 30 is provided with a function for converting a communication protocol of wireless communication network 20A or 20B into a communication protocol employed in the Internet 40, and vice versa. Relay device 30 relays data exchanged between wireless communication terminal 10A, which is served by communication network 20A or communication terminal 10B served by wireless communication network 20B, and a transmitter device 50 connected to the Internet 40.

Transmitter device 50 stores data or content provided, for example, in HTML, to be downloaded to a communication terminal through the Internet 40, and is capable of transmitting to a downloading terminal content according to a predetermined communication protocol such as TCP (Transmission Control Protocol). Window control is performed when content is downloaded to a downloading terminal in such a way that an amount of data transmitted is gradually increased so as to avoid congestion in a communication path between a correspondent terminal. Transmitter device 50, upon receiving a communication message (hereinafter, a content transmission request) requesting transmission of content stored in the device, divides the content into data units of a predetermined size, so as to generate a data block (hereinafter, segment) having a divided unit as well as a sequence number in units of bytes showing an original transmission order of the divided unit. Transmitter device 50 transmits a predetermined number of segments (hereinafter, congestion window size) sequentially in ascending order starting from a segment having a least recent sequence number, namely a segment having a smallest sequence number. Subsequently, transmitter device 50 increases a congestion window size according to a predetermined algorithm, e.g. a Slow Start algorithm, each time it receives a communication message (hereinafter, acknowledgement) having a sequence number of a segment next to be transmitted written therein, so as to transmit segments of a number defined by a current congestion window size. A Slow Start algorithm is an algorithm that causes transmitter device 50 to exponentially increase a congestion window size each time it receives an acknowledgement. A number of segments (hereinafter, transmission window size) transmitted by transmitter device 50 at one time can be, for example, either a congestion window size or an advertisement window size written in an acknowledgment, whichever is smaller. For the sake of description, however, it is assumed hereinafter that an advertisement window size has a value that is large enough to exceed a congestion window size, and that a transmission window size therefore always corresponds to a congestion window size.

Transmitter device 50 differs from a conventional transfer device which transmits content using window control, in that transmitter device 50 identifies a model type of a communication terminal 10 that has transmitted a content transmission request on the basis of data information contained in the request, and determines an initial value of the congestion window size (hereinafter, initial window size) on the basis of the identified model type so as to perform window control in an appropriate initial window size. Specifically, transmitter device 50 sets a value corresponding to 6 segments as an initial window size in a case that a transmitter of a content transmission request is communication terminal 10A; and in a case that the transmitter is a communication terminal 10B, a value corresponding to 3 segments is set as the initial window size. Transmitter device 50 is thus capable of changing, depending on a model type of a communication terminal to which content is transmitted, an initial window size that affects a transmission rate, such that a transmission rate for transmitting content to communication terminal 10A is set to be higher than a transmission rate for transmitting content to communication terminal 10B. Description will be given in the following with a focus on transmitter device 50 which exemplifies the particular characteristics of the communication system shown in FIG. 1.

A-2: Configuration of Transmitter Device 50

Figure 2:
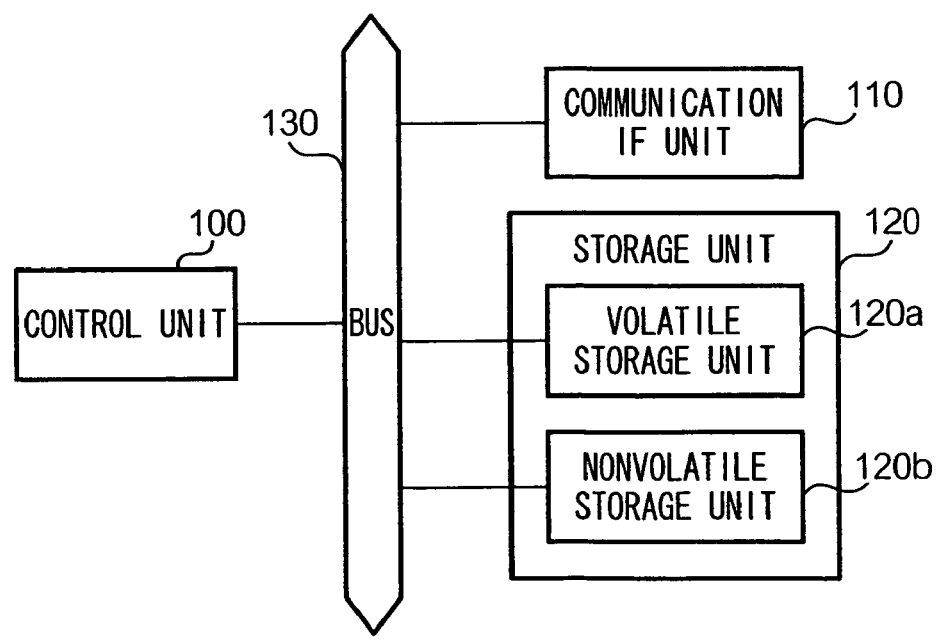
FIG. 2 is a diagram showing an example of a configuration of a transmitter device 50.

Description will be first given of a configuration of transmitter device 50 with reference to FIG. 2. FIG. 2 is a diagram showing an example of a hardware configuration of transmitter device 50. As shown in the figure, transmitter device 50 comprises a control unit 100, a communication interface (hereinafter, communication IF) unit 110, and a storage unit 120, and a bus 130 which relays data exchanged between each component of the device.

Control unit 100 is, for example, a CPU (Central Processing Unit) and controls each unit of transmitter device 50 by reading and executing software stored in storage unit 120. Communication IF unit 110 is connected to the Internet 40, and receives data transmitted through the Internet 40, passes the data to control unit 100, and transmits to the Internet 40 data received from control unit 100.

Figures 3, 4:
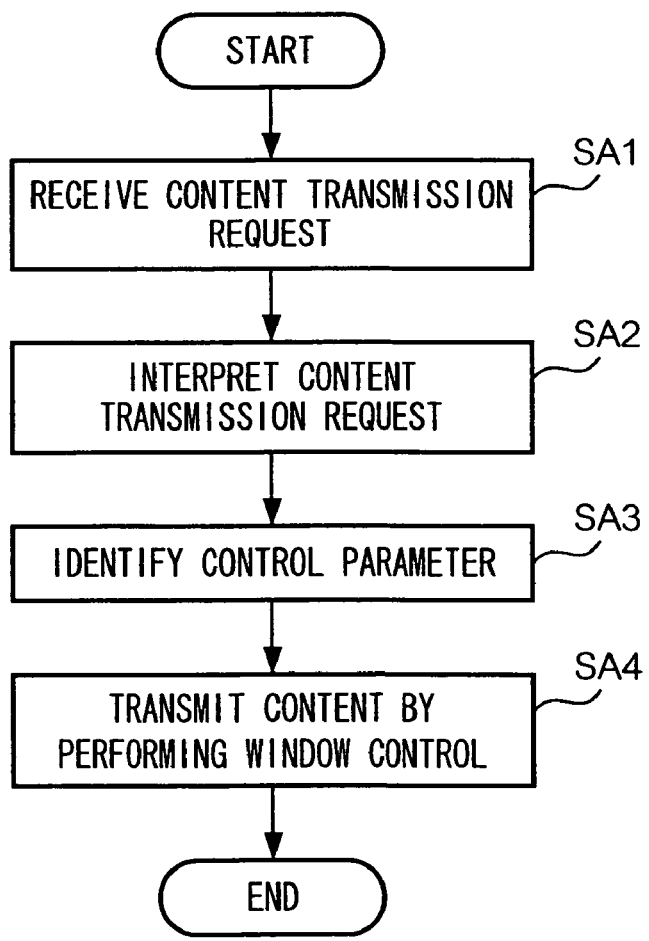
FIG. 3 is a diagram showing an example of details of data stored in a control parameter management table stored in nonvolatile storage unit 120b of transmitter device 50.
FIG. 4 is a flowchart showing a flow of a segment transmission process executed by control unit 100 of transmitter device 50.

Storage unit 120, as shown in FIG. 2, comprises a volatile storage unit 120a and a nonvolatile storage unit 120b. Volatile storage unit 120a is for example a RAM (Random Access Memory), and is used as a work area for control unit 100 which operates according to executed and running software. On the other hand, nonvolatile storage unit 120b is a hard disk and stores content, and a control parameter management table shown in FIG. 3. As shown in FIG. 3, stored in the control parameter management table are a type identifier (a communication address assigned to each communication terminal 10, in the present embodiment) for uniquely identifying a model type of communication terminal 10 associated with a control parameter (an initial window size, in the present embodiment) showing a mode of window control to be performed when transmitting content to communication terminal 10. For example, in the control parameter management table shown in FIG. 3, an initial window size is set to "6" when a destination of segments is communication terminal 10A, and set to "3" when a destination of segments is communication terminal 10B. The control parameter management table, which will be described in more detail later, is thus used to identify a suitable initial window size for each type of a communication terminal 10 to which segments are transmitted.

Stored in nonvolatile storage unit 120b in addition to the above content and control parameter management table are operating system (hereinafter, OS) software, segment transmission software, and other software. The OS software causes control unit 100 to perform particular functions, and the segment transmission software performs window control under control of the OS and causes control unit 100 to perform a process of segment transmission whereby segments are transmitted using a window control.

Control unit 100 performs the following functions when the software stored in nonvolatile storage unit 120b is executed and run.

When transmitter device 50 is turned on, control unit 100 first executes and runs the OS software from nonvolatile storage unit 120b. Control unit 100 running under the OS software is provided with a function of controlling each unit of transmitter device 50, and reading and executing other software from nonvolatile storage unit 120b. When execution of the OS software is completed, control unit 100 running under the OS immediately executes and runs the segment transmission software referred to above from nonvolatile storage unit 120b.

Control unit 100 running under the segment transmission software is provided with the following three functions. The first function is a receiving function whereby communication IF unit 110a receives a content transmission request transmitted through the Internet 40. The second function is an identifying function whereby, based on details of a content transmission request received by the receiving function and details of the control parameter management table, a mode of window control is identified to be performed when transmitting segments to a communication terminal which has transmitted the content transmission request. The third function is a transmission function whereby segments are generated by dividing content stored in nonvolatile storage unit 120b in a data unit of a predetermined size, and transmitted while performing window control in the mode identified by the identifying function. Specifically, a control parameter is identified by the identifying function, the identified control parameter being stored in the control parameter management table in correspondence with a type identifier that is the same as a type identifier (a communication address assigned to a communication terminal which has transmitted a content transmission request; hereinafter, a transmitter address) contained in the content transmission request received by the receiving function. In the present embodiment, the control parameter shows an initial window size such that the initial window size for transmitting content is identified by the identifying function, and window control is started with the identified window size.

As described in the foregoing, a hardware configuration of transmitter device 50 is the same as that of a general computer device, and transmitter device 50 is provided with functions particular to a transmitter device of the present invention by causing control unit 100 to execute software stored in storage unit 120. While in the present embodiment, software modules are used to provide characteristic functions particular to the transmitter device of the present invention, hardware modules that provide the same functions as those of the software modules can be alternatively used to configure transmitter device 50.

A-3: Operation of Transmitter Device 50

Description will now be given with reference to the drawings of an operation performed by transmitter device 50, in particular of an operation which shows the characteristics of transmitter device 50. In this example, it is assumed that control unit 100 of transmitter device 50 operates according to the segment transmission software, and is waiting to receive a content transmission request transmitted from communication terminal 10.

A user of communication terminal 10 activates the browsing function of the terminal 10 by operating an operator provided on its operation unit (not shown) as appropriate, to instruct the terminal 10 to download content stored in transmitter device 50 (e.g. input an URL of content). When such an operation is performed, communication terminal 10 generates a content transmission request requesting transmission of the content, for transmission to transmitter device 50. The content transmission request contains a transmitter address (a communication address assigned to communication terminal 10) for uniquely identifying a transmitter of the content transmission request.

A content transmission request transmitted from communication terminal 10 reaches transmitter device 50 first via wireless communication network 20, relay device 30, and then the Internet 40.

Description will be given hereinafter of an operation performed by control unit 100 of transmitter device 50 in the case of receiving a content transmission request, with reference to FIG. 4.

FIG. 4 is a flowchart showing a segment transmission process performed by control unit 100 of transmitter device 50 according to the segment transmission software. As shown in FIG. 4, control unit 100, upon receipt by communication IF unit 110 of a content transmission request (Step SA1), interprets the content transmission request to obtain a type identifier contained in the content transmission request (Step SA2). Specifically, control unit 100 obtains a transmitter address contained in the content transmission request received in Step SA1, as a type identifier. For example, in a case where a transmitter of the content transmission request is communication terminal 10A, a communication address assigned to communication terminal 10A is obtained as a type identifier, and in a case that a transmitter of the content transmission request is communication terminal 10B, a communication address assigned to communication terminal 10B is obtained as a type identifier.

Control unit 100 then identifies, based on the type identifier obtained in Step SA2 and details of the control parameter management table (refer to FIG. 3), a control parameter (an initial window size in the present embodiment) showing a mode of window control to be performed when transmitting content to a communication terminal of a type identified by the type identifier (Step SA3). Specifically, in a case that the type identifier identified in Step SA2 is a communication address included in "192.1.1.1-192.1.1.255", control unit 100 identifies a value of the initial window size as "6". On the other hand, in a case that the type identifier identified in Step SA2 is a communication address included in "192.1.2.1-192.1.2.255," control unit 100 identifies a value of the initial window size as "3".

Control unit 100 then performs window control in a mode designated by the control parameter identified in Step SA3, to thereby transmit the content (Step SA4). Specifically, control unit 100 generates segments by dividing content stored in nonvolatile storage unit 120b into data units of a predetermined size, to transmit the segments of a number identified by the initial window size identified in Step SA3, starting from a least recent segment of the segments generated. From then on, control unit 100 transmits segments by performing window control such as increasing the congestion window size according to a predetermined algorithm, e.g. Slow Start algorithm, each time an acknowledgement is received at communication terminal 10. For example, when content is transmitted to communication terminal 10A, 6 segments are initially transmitted, and a number of segments transmitted is exponentially increased each time an acknowledgment is received from communication terminal 10A. In a case where content is transmitted to communication terminal 10B, three segments are initially transmitted, and a number of segments for transmission is exponentially increased each time an acknowledgment is received from communication terminal 10B.

As described in the foregoing, according to the present embodiment, content can be transmitted by performing window control with an initial window size that is appropriate for a model type of a correspondent communication terminal (communication terminal 10A or 10B). An initial window size identified when a destination of content is communication terminal 10A is larger than that which is identified when a destination of content is communication terminal 10B; that is, a transmission rate for transmitting content to communication terminal 10A can be set to be faster than a transmission rate for transmitting content to communication terminal 10B. Thus, according to the present embodiment, content can be transmitted with a transmission rate that is appropriate for a model type of a destination communication terminal. Further, since a model type of a communication terminal is used as a basis for deciding an appropriate transmission rate, an optimum transmission rate can be reliably selected even in a mobile communication network having a wireless zone where a communication state is unstable.

B: Second Embodiment

Description will be next given of a communication system according to a second embodiment of the present invention.

B-1: Configuration of Communication System

Figure 5:
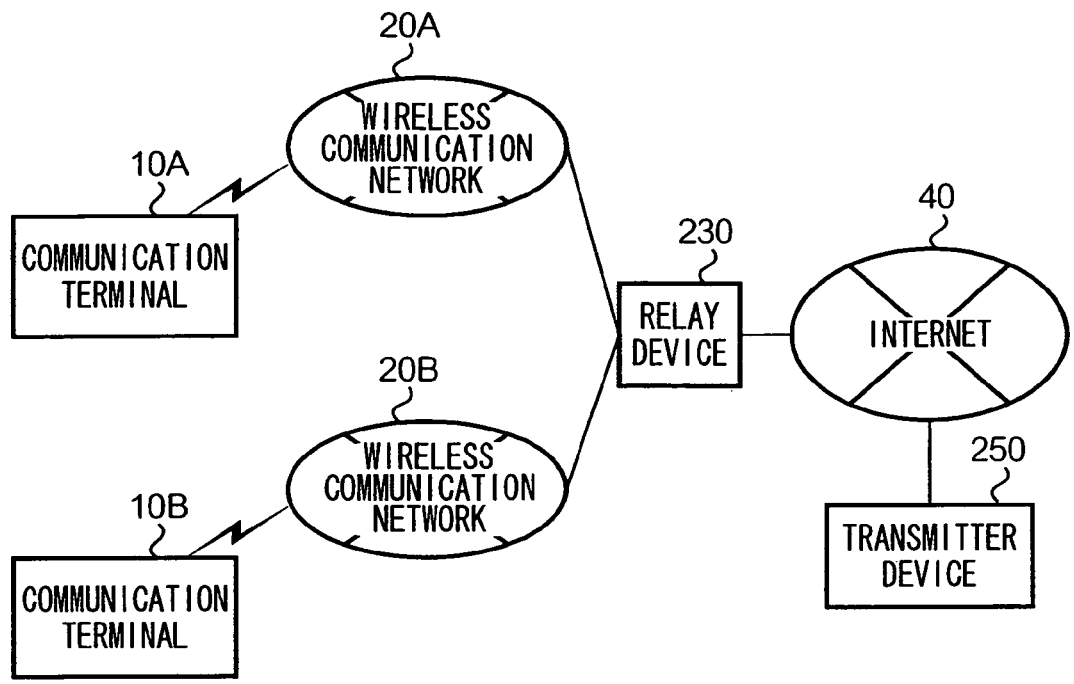
FIG. 5 is a diagram showing an example of a configuration of a communication system according to a second embodiment of the present invention.

FIG. 5 is a diagram showing an example of a communication system according to the second embodiment of the present invention. The communication system shown in FIG. 5 differs from that shown in FIG. 1 in that relay device 230 is provided in place of relay device 30, and that transmitter device 250 is provided in place of transmitter device 50.

Transmitter device 250 differs from transmitter device 50 in that the device 250 transmits content by performing window control according to a control parameter written in a received content transmission request.

Relay device 230 differs from relay device 30 in that the device 230, when a content transmission request transmitted from communication terminal 10 is redirected to transmitter device 250, writes in the request a control parameter showing a mode of window control to be conformed to by transmitter device 250 before transmission. Description will be given hereinafter, focusing on relay device 230 having characteristics particular to the present embodiment.

B-2: Configuration of Relay Device 230

Figure 6:
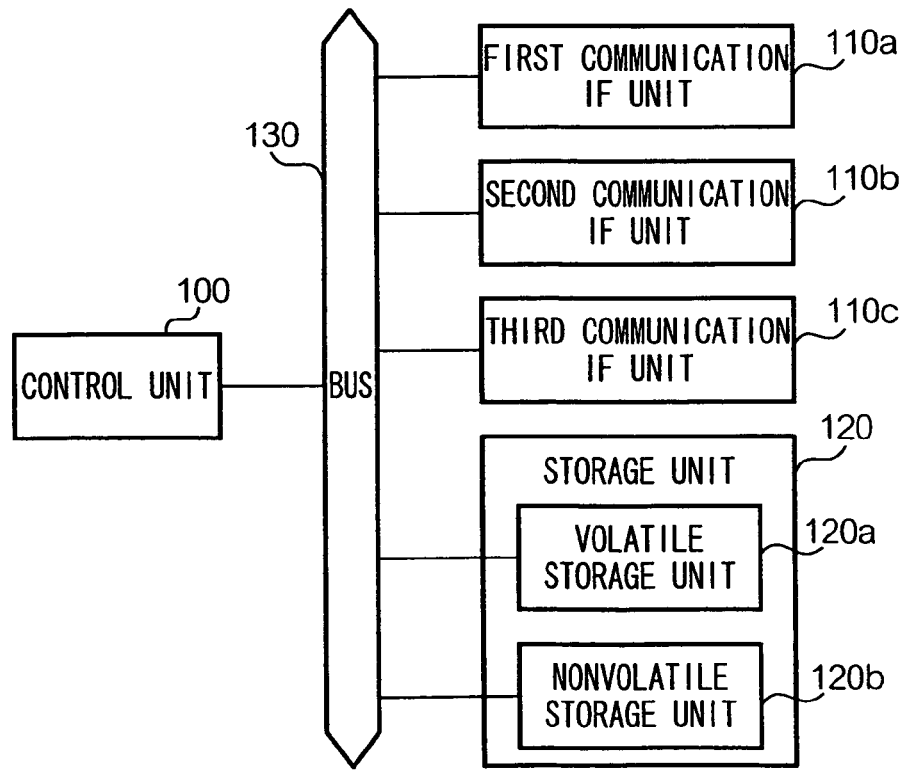
FIG. 6 is a diagram showing an example of a configuration of a relay device 230.

FIG. 6 is a diagram showing an example of a configuration of relay device 230. As shown in the figure, the configuration of relay device 230 differs from that of transmitter device 50 (refer to FIG. 2) in that a first communication IF unit 110a, a second communication IF unit 110b, and a third communication IF unit 110c are provided in place of communication IF unit 110.

First communication IF unit 110a is connected to wireless communication network 20A, receives data transmitted through wireless communication network 20A to pass the data to control unit 100, and transmits data received from control unit 100 to wireless communication network 20A. Second communication IF unit 110b is connected to wireless communication network 20B, receives data transmitted through wireless communication network 20B, passes the data to control unit 100, and transmits to wireless communication network 20B data received from control unit 100. Third communication IF unit 110c is connected to the Internet 40, receives data transmitted through wireless communication network 20B, passes the data to control unit 100, and transmits data received from control unit 100 to the Internet 40. In the present embodiment, there are provided separate hardware devices: a communication IF for performing communication through wireless communication network 20A; a communication IF for performing communication through wireless communication network 20B; and a communication IF for performing communication through the Internet 40, but a single hardware device having combined functions of the above communication IFs can be provided instead.

The data stored in nonvolatile storage unit 120b of relay device 230 differs from that which is stored in nonvolatile storage unit 120b of transmitter device 50 in the following two points. First, content is not stored in nonvolatile storage unit 120b of relay device 230 since relay device 230 only serves to transfer content transmitted from transmitter device 250 to communication terminal 10, and therefore need not store any content. Second, relay software is stored instead of the segment transmission software, the relay software causing control unit 100 to perform a relay process shown in FIG. 7.

In the following, description will be given of functions provided to control unit 100 when software stored in nonvolatile storage unit 120b is executed. When relay device 230 is turned on, control unit 100 executes and runs OS software from nonvolatile storage unit 120b. Functions provided to control unit 100 running under the OS software are the same as those provided to control unit 100 of transmitter device 50. When the execution of the OS software is completed, control unit 100 which is running under the OS immediately executes the relay software from nonvolatile storage unit 120b. Control unit 100 operating according to the relay software is imparted the following three functions.

The first function is a function of receiving a content transmission request through wireless communication network 20 by means of first communication IF unit 110a or second communication IF unit 110b. The second function is a function of identifying a control parameter to be notified to transmitter device 250 based on details of a content transmission request received by the above receiving function and details of data stored in a control parameter management table (refer to FIG. 3) The third function is a function of transferring a content transmission request to transmitter device 250 through third communication IF unit 110c after writing therein a control parameter identified by the identifying function, while receiving a segment transmitted from transmitter device 250 through third communication IF unit 110c and transferring the received segment to a destination communication terminal 10 through first communication IF unit 110a or second communication IF unit 110b. As described above, a control parameter stored in the control parameter management table shows an initial window size. In the present embodiment, an initial window size of window control to be performed by transmitter device 250 when transmitting content to communication terminal 10 is determined by the identifying function, and a content transmission request containing the identified initial window size is transferred to transmitter device 250.

As also described above, a hardware configuration of relay device 230 is the same as that of a general computer device. Software stored in storage unit 120 is executed by control unit 100, thereby imparting to a general computer device the functions particular to the relay device of the present embodiment. In the present embodiment, software modules are used to realize the above functions, but hardware modules can alternatively be used if they provide the same functions as those of the software modules.

B-3: Operation of Relay Device 230

Figure 7:
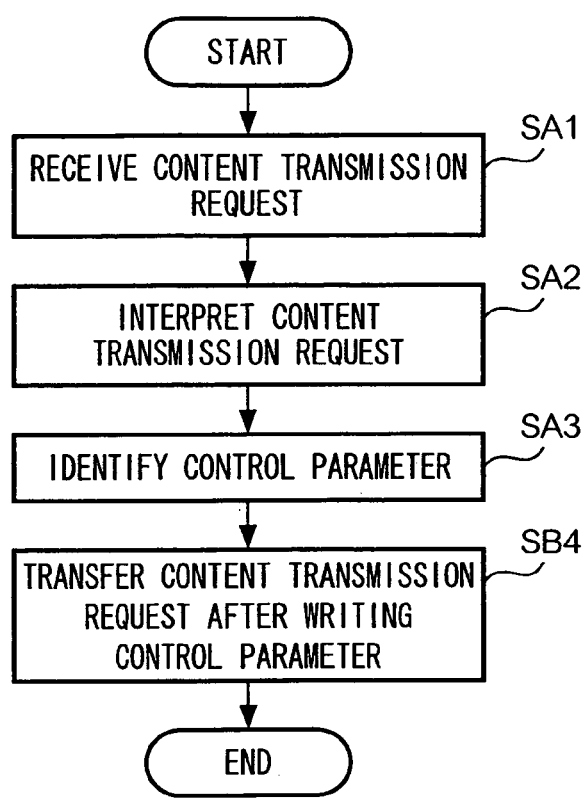
FIG. 7 is a flowchart showing a flow of a relay process performed by control unit 100 of relay device 230.

Description will be now given of an operation performed by relay device 230. FIG. 7 is a flowchart showing a relay process performed by control unit 100 operating according to the relay software. The relay process shown in FIG. 7 differs from a segment transmission process shown in FIG. 4 in that Step SA4 is replaced with Step SB4. In Step SB4, control unit 100 writes in a content transmission request received in Step SA1 a control parameter (an initial window size in the present embodiment) identified in Step SA3 for transfer to transmitter device 250.

Thus, the transferred content transmission request reaches transmitter device 250 through the Internet 40. Transmitter device 250 performs window control in a mode specified by a control parameter contained in the content transmission request so as to transmit a segment containing a divided portion of content. Specifically, transmitter device 250 performs window control by setting an initial window size at "6" when transmitting content to communication terminal 110A, and the initial window size is set at "3" in performing window control when transmitting content to communication terminal 110B. From then on, control unit 100 of relay device 230, when it receives a segment transmitted from transmitter device 250, transfers the segment to a destination communication terminal 10, and transfers to transmitter device 250 an acknowledgement transmitted from communication terminal 10. Thus, the same effects as attained in the first embodiment are attained by using relay device 230 of the present embodiment.

C: Third Embodiment

Description will be now given of a communication system according to a third embodiment with reference to the drawings.

C-1: Configuration of Communication System

Figure 8:
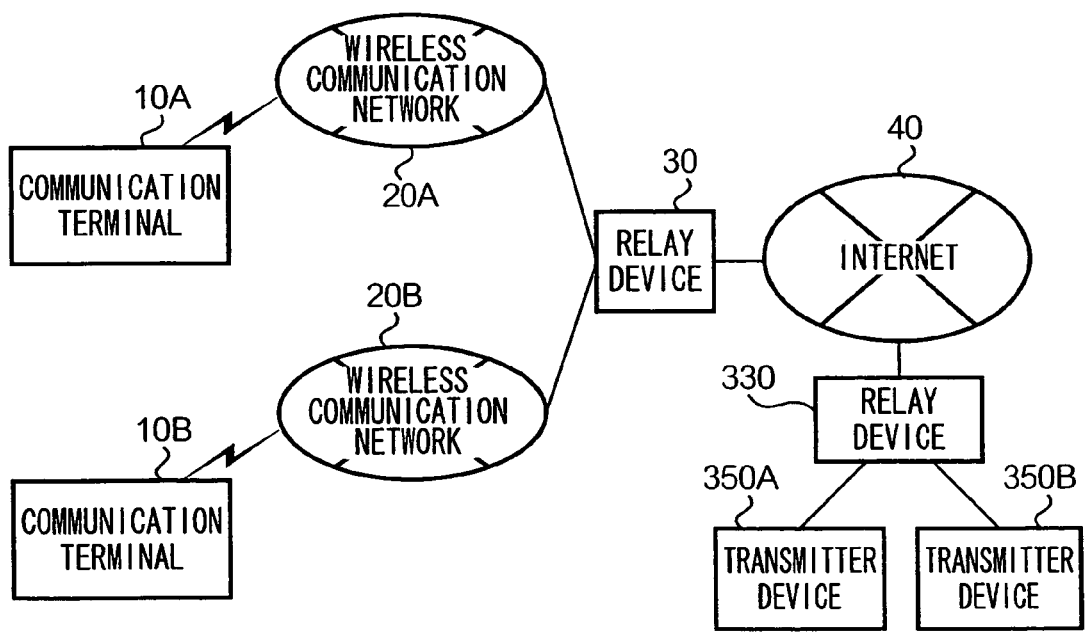
FIG. 8 is a diagram showing an example of a configuration of a communication system according to a third embodiment of the present invention.

FIG. 8 is a diagram showing an example of a communication system according to the third embodiment of the present invention. The communication system shown in FIG. 8 differs from that shown in FIG. 1 in that transmitter device 50 is replaced with transmitter devices 350A and 350B and that transmitter device 350A and 350B each is connected through relay device 330 to the Internet 40.

Transmitter device 350A and 350B each store the same content, and have a function of transmitting the content by performing window control in different modes. Specifically, transmitter device 350A sets an initial window size always at "6", to thereby perform window control, and transmitter device 350B sets an initial window size always at "3". That is, transmitter device 350A and 350B are conventional transmitter devices which perform window control only in a predetermined mode. Detailed description of transmitter device 350A and 350B is therefore omitted. In the following, transmitter device 350A and 350B will be collectively referred to as "transmitter device 350," unless otherwise stated.

Relay device 330 shown in FIG. 8 is, for example, a load distribution unit, and has a function of transmitting a content transmission request received through the Internet 40 either to transmitter device 350A or 350B so as to distribute the data transmission load. Relay device 330 differs from a conventional load distribution unit in that the device 330 identifies a transmitter device 350 to perform window control that is appropriate for a communication terminal 10 that has transmitted a content transmission request, depending on a model type of the transmitter communication terminal 10, and transmits the content transmission request to the identified transmitter device 350. Detailed description will now be given of relay device 330 with reference to particular characteristics of the present embodiment.

C-2: Configuration of Relay Device 330

Figures 9, 10:
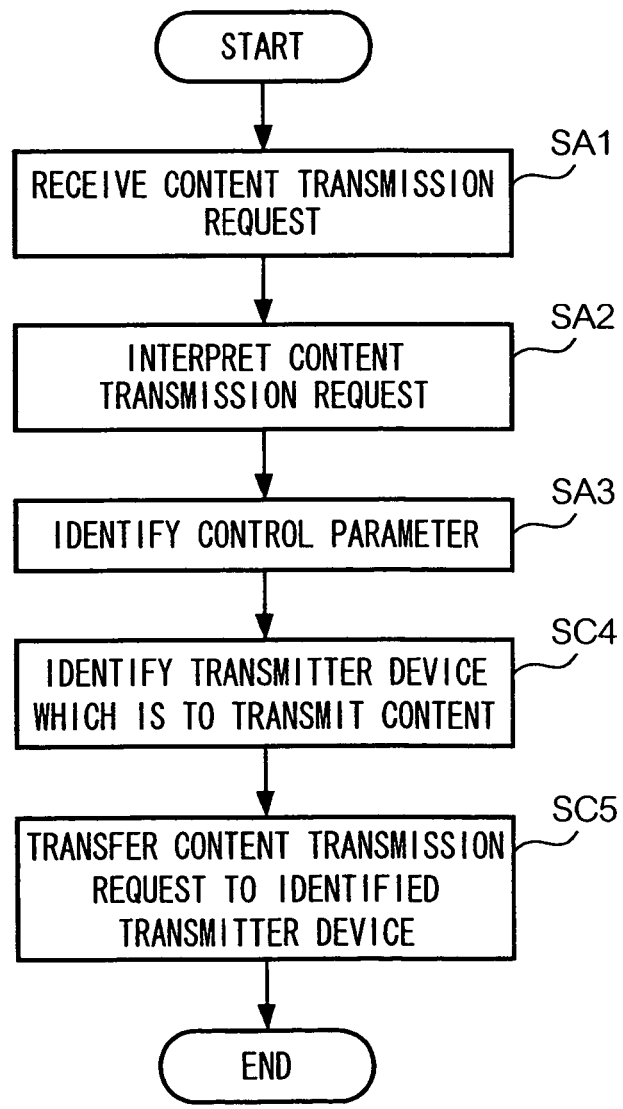
FIG. 9 is a diagram showing an example of details of data stored in a transmitter management table stored in relay device 330.
FIG. 10 is a flowchart showing a flow of a relay process performed by control unit 100 of relay device 330.

A configuration of relay device 330 is the same as that of relay device 230 except for the following four points. That is, first communication IF unit 110a is connected to transmitter device 350A; second communication IF unit 110b is connected to transmitter device 350B; a transmitter management table shown in FIG. 9 is stored in nonvolatile storage unit 120b; and relay software for causing control unit 100 to execute a relay process of FIG. 10, instead of that of FIG. 7, is stored in nonvolatile storage unit 120b. In the transmitter management table, transmitter identifiers for uniquely identifying transmitter device 350A and 350B (e.g. communication address assigned to transmitter device 350) are stored in correspondence with control parameters predetermined for each transmitter device 350.

Control unit 100 is provided with the following three functions by executing and running the relay software. The first function is a function of receiving a content transmission request transmitted through the Internet 40 by means of third communication IF unit 110c. The second function is a function of identifying, based on details of a content transmission request received by the receiving function and details of data stored in the control parameter management table (refer to FIG. 3), a control parameter showing a mode of window control to be performed when transmitting content to communication terminal 10, and also identifying which transmitter device 350 should transmit content to communication terminal 10 on the basis of the identified control parameter and details of data stored in the transmitter management table. The third function is a function of transferring a content transmission request received by the receiving function to a transmitter device 350 identified by the identifying function, and receiving a segment transmitted from transmitter device 350 to transfer the segment to a destination communication terminal 10.

C-3: Operation of Relay Device 330

Description will be now given of an operation of relay device 330. FIG. 10 is a flowchart showing a flow of a relay process performed by control unit 100 operating according to the relay software. The relay process shown in FIG. 10 differs from the segment transmission process shown in FIG. 4 in that Step SA4 is replaced with Step SC4 and SC5.

In Step SC4, control unit 100 identifies, based on a control parameter (an initial window size in the present embodiment) identified in Step SA3 and details of data stored in the transmitter management table, which transmitter device 350 should transmit content to communication terminal 10 that has transmitted a content transmission request received in Step SA1. Specifically, control unit 100 obtains a transmitter identifier which is stored in correspondence with a control parameter that is the same as a control parameter identified in Step SA3, thereby identifying a transmitter device 50 which should transmit content to a destination communication terminal 10. For example, in a case where a transmitter of a content transmission request is communication terminal 10A, "6" is identified as value of a control parameter in Step SA3; and in Step SC4, transmitter device 350A is identified as a transmitter device which should transmit content to communication terminal 10A.

In Step SC5 following Step SC4, control unit 100 transfers a content transmission request received in Step SA1 to a transmitter device identified in Step SC4. From then on, control unit 100 of relay device 330, when it receives a segment transmitted from transmitter device 350, transfers the segment to a destination communication terminal 10, while relay device 330 transfers an acknowledgement transmitted from the communication terminal 10 to transmitter device 350. As descried in the foregoing, the same effects as attained in the first embodiment can be attained by using relay device 330 according to the present embodiment.

D: Fourth Embodiment

Description will now be given of a communication system according to a fourth embodiment with reference to the drawings.

D-1: Configuration of Communication System

Figure 11:
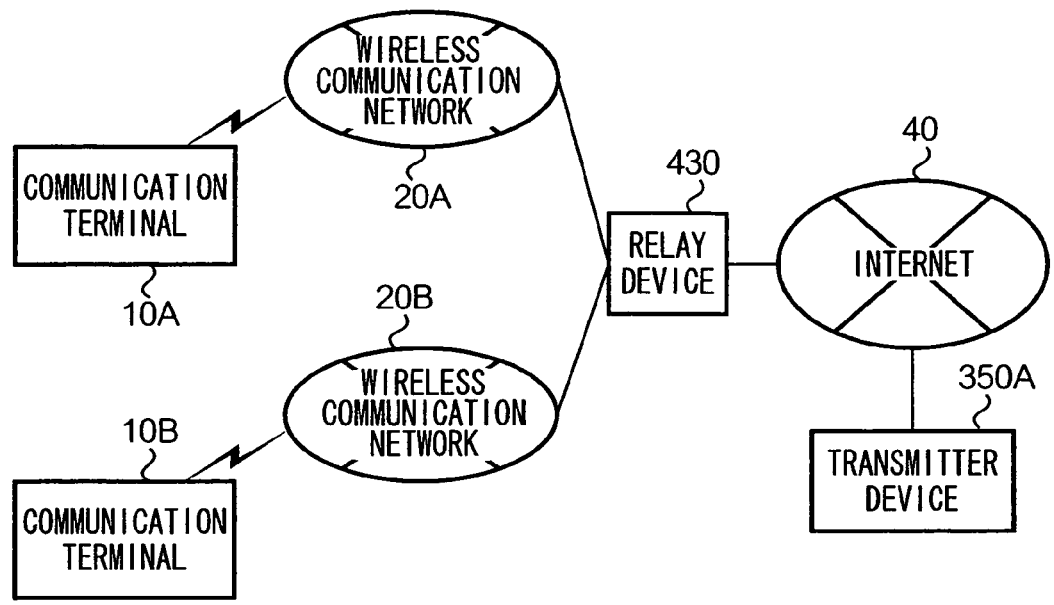
FIG. 11 is a diagram showing an example of a configuration of a communication system according to a fourth embodiment of the present invention.

FIG. 11 is a diagram showing an example of a communication system according to the fourth embodiment of the present invention. The communication system shown in FIG. 11 differs from that which shown in FIG. 1 in that relay device 30 is replaced with relay device 430 and that transmitter device 50 is replaced with transmitter device 350A.

Relay device 430 differs from relay device 30 in that relay device 430, when transferring a segment transmitted from transmitter device 350A to communication terminal 10, transfers the segment while performing window control in a mode suited for a model type of the destination communication terminal 10. Description will be given in the following with focus on relay device 430 which has characteristics particular to the present embodiment.

D-2: Configuration of Relay Device 430

Figure 12:
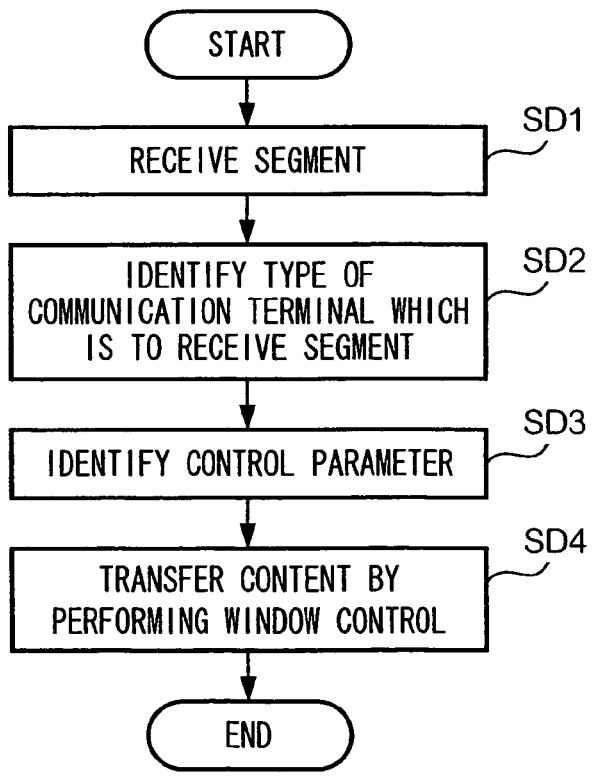
FIG. 12 is a flowchart showing a flow of a relay process performed by control unit l00 of relay device 430.

A configuration of relay device 430 is the same as that of relay device 230 except that, relay software for causing control unit 100 to execute a relay process shown in FIG. 12 is stored in nonvolatile storage unit 120b, instead of relay software for causing control unit 100 to execute a relay process shown in FIG. 7. Since the relay software stored in nonvolatile storage unit 120b is different, control unit 100 of relay device 430 is provided with different functions from those provided to control unit 100 of relay device 230.

Specifically, the following three functions are provided to control unit 100 of relay device 430. The first function is a function of receiving a segment transmitted through the Internet 40. The second function is a function of identifying a model type of a communication terminal which is to receive a segment based on details of the segment received by the receiving function, and for identifying, based on the identified model type of communication terminal 10 and details of data stored in the control parameter management table (refer to FIG. 3), a control parameter showing a mode of window control to be performed in transmitting the segment. The third function is a function of transferring a segment to a destination communication terminal 10 by performing window control in a mode specified in a control parameter identified by the identifying function. As described above, a control parameter stored in the control parameter management table shows an initial window size. Thus, in the present embodiment, an initial window size for transferring content is determined by the identifying function, and window control is performed with the determined initial window size as an initial value of the window size to transfer the content.

D-3: Operation of Relay Device 430

Description will be next be given of an operation performed by relay device 430. FIG. 12 is a flowchart showing a flow of a relay process performed by control unit 100 running the relay software. As shown in FIG. 12, control unit 100 of relay device 430, when it receives a segment by means of third communication IF unit 110c (Step SD1), interprets details of the segment and identifies a model type of communication terminal 10 which is to receive the segment (Step SD2). Specifically, control unit 100 obtains a destination address contained in a segment received in Step SD1 as the type identifier, to thereby identify a model type of a communication terminal which is to receive the segment.

Control unit 100 subsequently identifies, based on the identified result in Step SD2 and details of data stored in the control parameter management table (refer to FIG. 3), a control parameter showing a mode of window control to be performed when transferring content (the initial window size in the present embodiment) (Step SD3). Specifically, when a destination of a segment is identified as being communication terminal 10A in Step SD2, control unit 100 identifies the initial window size as "6". Conversely, when a destination of a segment is identified as being communication terminal 10B, control unit 100 identifies the initial window size as "3". Control unit 100 then transfers the segment received in Step SD1 while performing window control with the initial window size identified in Step SD3 (Step SD4). As described above, the use of relay device 430 of the present embodiment enables transfer of a segment in an initial window size, i.e., a transmission rate, depending on a communication terminal to which the segment is destined.

In the present embodiment, a segment received in Step SD1 is transferred as it is in Step SD4. However, a received segment can be temporarily stored in a storage area (hereinafter, cache area) provided in volatile storage unit 120a (or non-volatile storage unit 120b) for storing a segment received in Step SD1, so that the segment is transferred in Step SD4. In this way, even when a transmission rate in wireless communication network 20 differs from (e.g. is slower than) that available in the Internet 40, relay device 430 is enabled to adjust a difference in transmission rate between the two networks. Thus, even when the former is substantially slower than the latter, a number of segments flowing into wireless communication network 20 can be adjusted depending on transmission rate, whereby possible congestion in wireless communication network 20 can be avoided.

In the present embodiment, a destination address contained in a segment transmitted from transmitter device 350A is used as a basis for identifying an initial window size for window control to be performed in transferring the segment to a communication terminal 10 which is the designated recipient of the segment. However, it is also possible to identify, at the time of receiving a content transmission request received from communication terminal 10, an initial window size to be used when transferring a segment containing a divided portion of content to communication terminal 10. Specifically, the following operation is performed by control unit 100. When a content transmission request is received, a transmitter address contained in the content transmission request is identified as a type identifier, and then an initial window size is identified for window control performed in transferring a segment to communication terminal 10. The identified initial window size is then stored in storage unit 120 in correspondence with a transmitter address and a destination address contained in the content transmission request. A relay device 430, from then on, when it receives a segment which is transmitted from a transmitter device identified by the stored destination address and also is destined to a communication terminal identified by the stored transmitter address, performs window control with the initial window size stored in storage unit 120 in correspondence with the transmitter address and the destination address for transfer of the segment to its destination. In this way, it becomes possible to identify, based on details of a content transmission request transmitted from communication terminal 10, an initial window size to be used for window control when transferring a segment containing a divided portion of content.

E: Fifth Embodiment

E-1: Configuration of Communication System

Figure 13:
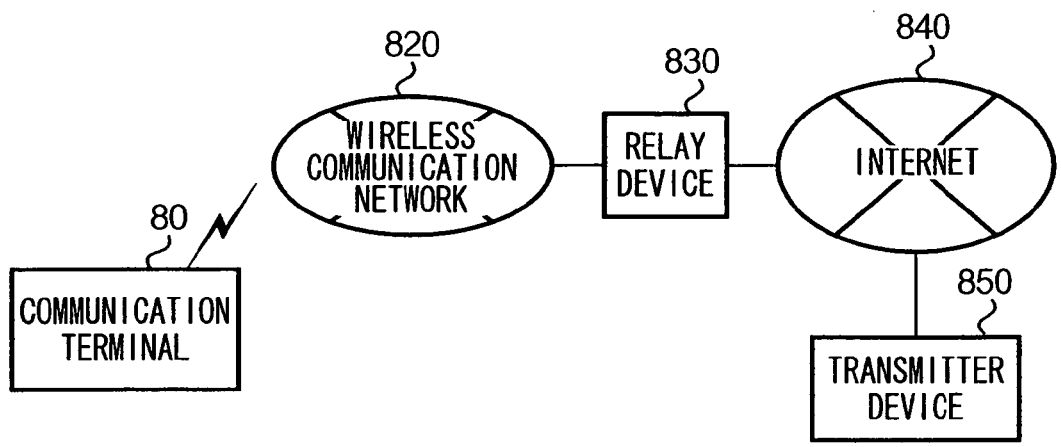
FIG. 13 is a diagram showing an example of a configuration of a communication system according to a fifth embodiment of the present invention.

FIG. 13 is a diagram showing an example of a configuration of a communication system according to a first embodiment of the present invention. A communication terminal 80 is a mobile phone employing a W-CDMA system having a browser function. Communication terminal 80 can alternatively be a mobile phone employing a PDC system, a PHS, a PDA, or a mobile PC so long as it has a browser function. While in actuality there is a plurality of communication terminal 80, only one such communication terminal is shown in the figure.

A wireless communication network 820 is a wireless communication network in a W-CDMA system, and serves W-CDMA system mobile phones located in a covered service area to provide a wireless communication service.

A relay device 830 is, for example, a gateway device, and is connected to wireless communication network 820 and the Internet 840. Relay device 830 has a function of converting a communication protocol used in wireless communication network 820 into a communication protocol used in the Internet 840, and vice versa. Relay device 830 relays data exchanged between communication terminal 80 served by wireless communication network 820 and a transmitter device 850 connected to the Internet 840.

Transmitter device 850 stores content (e.g. text data in HTML) for transmission through the Internet 840. Transmitter device 850 is capable of transmitting content according to a predetermined communication protocol such as TCP (Transmission Control Protocol) while performing window control and gradually increasing an amount of data transmitted so as to avoid congestion in a communication path between a correspondent terminal. Specifically, transmitter device 850, when it receives a content transmission request for requesting transmission of content, first divides content into units of a predetermined data size and generates a segment containing a divided portion of the content and a sequence number for identifying the particular divided portion. Transmitter device 850 then sequentially transmits segments of a predetermined number defined by the congestion window size, starting from a least recent sequence number. From then on, transmitter device 850 increases the congestion window size according to an algorithm such as Slow Start algorithm each time it receives an acknowledgment for a transmitted segment(s), so as to transmit subsequent segments. As in the foregoing embodiments, it is assumed that an advertisement window size has a sufficiently large value that a transmission window size always corresponds to congestion window size.

Transmitter device 850 differs from a conventional transmitter device for transmitting content by performing window control. That is, window control is performed such that an initial window size of the congestion window size is changed depending on a data amount of content to be transmitted to a communication terminal 80 which has transmitted a content transmission request. Specifically, in a case that a data amount of content is equal to or larger than 50 kbytes (1 kbyte=1024 bytes), transmitter device 850 sets a value of the initial window size to correspond to three segments. In a case that a data amount of content is less than 50 kbytes, an initial window size is set to a value corresponding to 10 segments. Accordingly, in the present embodiment, in a case that a data amount of content is small, transmitter device 850 is able to complete transmission of the content using only a few transmission operations. Description will be given in the following with a focus on transmitter device 850 with reference to particular characteristics of the communication system of FIG. 13.

E-2: Configuration of Transmitter Device 850

Figure 14:
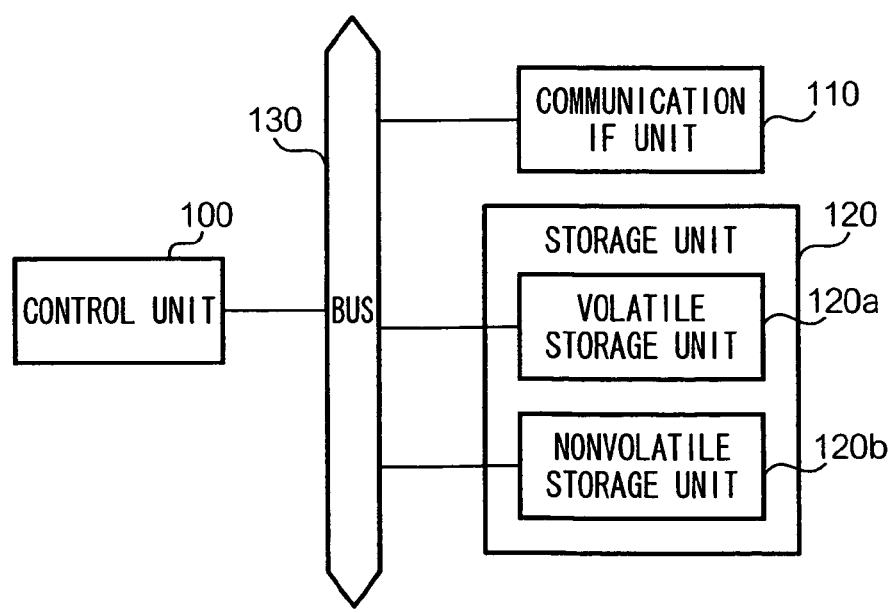
FIG. 14 is a diagram showing an example of a configuration of a transmitter device 850.

Description will be first given of a configuration of transmitter device 850 with reference to FIG. 14. FIG. 14 is a diagram showing an example of a hardware configuration of transmitter device 850. As shown in the figure, transmitter device 850 comprises a control unit 100, a communication interface IF unit 110, a storage unit 120, and a bus 130 for relaying data exchanged between each unit of the device 850.

Control unit 100 is, for example, a CPU. Control unit 100 reads executes and runs software stored in storage unit 120 to thereby control each unit of transmitter device 850. Communication IF unit 110 is connected to the Internet 840; communication IF unit 110 receives data transmitted through the Internet 840, passes the data to control unit 100, and transmits data received from control unit 100 to the Internet 840.

Figures 15, 16:
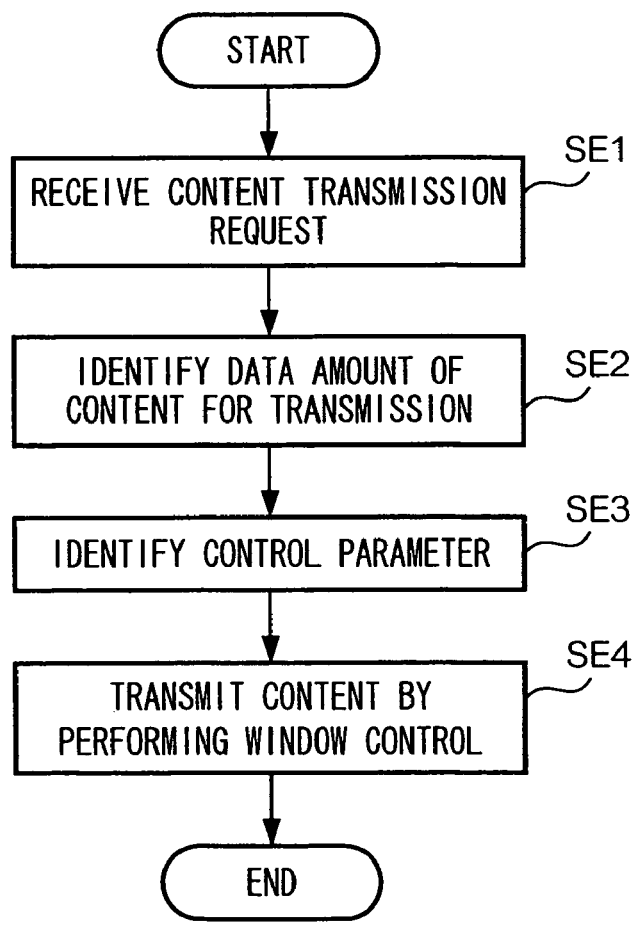
FIG. 15 is a diagram showing an example of details of data stored in a control parameter management table stored in a nonvolatile storage unit 120b of transmitter device 850.
FIG. 16 is a flowchart showing a flow of a segment transmission process performed by control unit 100 of transmitter device 850.

Storage unit 120, as shown in FIG. 14, comprises a volatile storage unit 120a and a nonvolatile storage unit 120b. Volatile storage unit 120a is for example a RAM and is used as a work area by control unit 100 running software. Nonvolatile storage unit 120b is, for example, a hard disk, and stores content, and also a control parameter management table shown in FIG. 15. The control parameter management table, as shown in FIG. 15, stores a control parameter (an initial window size in the present embodiment) showing a mode of window control to be performed in transmitting content, in correspondence with a data amount of content to be transmitted to a transmitter of a content transmission request. For example, in the control parameter management table shown in FIG. 15, an initial window size is set at "3" when a data amount of content to be transmitted is equal to or larger than 50 kbytes; and an initial window size is set at "10" when a data amount of content is less than 50 kbytes. Described in greater detail later, the control parameter management table is used by control unit 100 to determine an initial window size that is appropriate for a data amount of content to be transmitted.

Stored in nonvolatile storage unit 120b in addition to content and the control parameter management table is software such as OS software, segment transmission software, and the like. The OS software is run by control unit 100 so as to provide particular functions of the OS, and the segment transmission software is executed by control unit 100 under control of the OS to perform a segment transmission process of transmitting segments while performing window control.

Following are described the functions provided to control unit 100 when running the segment transmission software. When transmitter device 850 is turned on, control unit 100 first executes and runs the OS software from nonvolatile storage unit 120b. Control unit 100 running under the OS software functions to control each unit of transmitter device 850 and to read and execute other software from nonvolatile storage unit 120b. When execution of the OS software is completed, control unit 100 running the OS immediately executes and runs the segment transmission software from nonvolatile storage unit 120b.

Control unit 100 operating according to the segment transmission software is provided with the following three functions. The first function is a function of receiving a content transmission request transmitted through the Internet 840 by means of communication IF unit 110. The second function is a function of identifying, based on a data amount of content which was requested to be transmitted by the content transmission request received by the receiving function and details of data stored in the control parameter management table, a mode of window control to be performed when transmitting content to a communication terminal which has transmitted the request. The third function is a function of generating segments by dividing content stored in nonvolatile storage unit 120b in predetermined data size units, and of transmitting the generated segments while performing window control in a mode identified by the identifying function. A control parameter identified by the identifying function is an initial window size according to the present embodiment; that is, window control is started with an initial window size depending on a data amount of content to be transmitted to communication terminal 80.

As described above, a hardware configuration of transmitter device 850 is the same as that of a general computer device, and functions particular to a transmitter device of the present invention are imparted to such a general computer device by causing control unit 100 to execute various software stored in storage unit 120. In the present embodiment, functions particular to the transmitter device of the present invention are realized by using software modules, but hardware modules can be used to configure transmitter device 850 if they have the same functions as those of the software modules.

E-3: Operation of Transmitter Device 850

Description will now be given of an operation of transmitter device 850, with reference to the drawings, with particular focus on an operation showing characteristics of the device 850. In this example, control unit 100 of transmitter device 850 is operating according to segment transmission software, and is waiting for receipt of a content transmission request transmitted from communication terminal 80.

A user of communication terminal 80 operates an operator provided with an operation unit (not shown) as appropriate to activate the browser function, thereby to give an instruction for obtaining content stored in transmitter device 850 (e.g. to input a URL for the content). When such an operation is performed at communication terminal 80, communication terminal 80 generates a content transmission request requesting transmission of the content, for transmission to transmitter device 850.

A content transmission request transmitted from communication terminal 80 reaches transmitter device 850 through wireless communication network 820, relay device 830, and then the Internet 840. Description will be given in the following of an operation performed by control unit 100 of transmitter device 850 upon receiving the content transmission request, with reference to FIG. 16.

FIG. 16 is a flowchart showing a flow of a segment transmission process performed according to the segment transmission software by control unit 100 of transmitter device 850. As shown in FIG. 16, control unit 100, when it receives, by means of communication IF unit 110, a content transmission request (Step SE1), interprets the content transmission request to identify a data amount of content which is requested to be transmitted by the content transmission request (Step SE2). Specifically, control unit 100 reads from nonvolatile storage unit 120*b* content specified by an URL contained in the content transmission request received in Step SE1 to expand the content in volatile storage unit 120*a*, and performs a computation to identify a data amount of the expanded content. Though in the present embodiment, the data amount of content is identified by computing a data amount of content expanded in volatile storage unit 120*a*, directory information or the like which is managed by the OS can be referred to, to identify a data amount of the content, where the directory information is data showing a layered structure of a file system provided in nonvolatile storage unit 120*b* and data showing a data amount or the like of a file belonging to each layer of the structure.

Control unit 100 then identifies a control parameter (an initial window size in the present embodiment) showing a mode of window control to be performed in transmitting the content, based on the data amount identified in Step SE2 and details of data stored in the control parameter management table (refer to FIG. 15) (Step SE3). In a case that the data amount identified in Step SE2 is equal to or larger than 50 kbytes, control unit 100 identifies a value of the initial window size as being "3"; and in a case that the data amount identified in Step SE2 is less than 50 kbytes, control unit 100 identifies a value of the initial window size as being "10".

Control unit 100 then transmits the content by performing window control in a mode designated by the control parameter identified in Step SE3 (Step SE4). Specifically, control unit 100 divides the content expanded in volatile storage unit 120*a* in Step SE1 into predetermined data size units to generate segments, and transmits segments starting from a least recent segment by a number defined an initial window size designated by the control parameter identified in Step SE3. From then on, control unit 100 performs window control to transmit the content, such that the congestion window size is increased according to a predetermined algorithm such as Slow Start algorithm each time it receives an acknowledgement transmitted from communication terminal 80.

If it is assumed for example that a predetermined data size into which content is to be divided into is 1 kbyte, and that the content has a data size of 9 kbytes, an initial window size is identified in Step SE3 as being a value corresponding to a data amount of 10 segments, i.e., 10 kbytes. Since the data amount of the content is assumed as being 9 kbytes, the content is divided into 9 segments before transmission (a data amount of a header contained in each segment is not counted). Since an initial window size is being set to a value corresponding to 10 segments, all of the 9 segments corresponding to the content are transmitted in one transmission operation. Conversely, since, in conventional window control, the default value of an initial window size is 3, and the first 3 segments out of the 9 segments corresponding to the content are first transmitted and then the remaining 6 segments are transmitted after an acknowledgment is received for the transmitted segment(s). That is, two transmission operations need to be performed when conventional window control is employed. Thus, according to the present embodiment, only one transmission operation is required when transmitting content having a data amount that is smaller than a predetermined value, when the content is to be transmitted to a communication terminal.

As described in the foregoing, according to the present embodiment, window control can be performed such that an initial window size is appropriately set for a data amount of content to be transmitted to communication terminal 80. Further, since the amount of data transmitted to communication terminal 80 is used as a basis for selecting an appropriate transmission rate, an optimum transmission rate can be reliably selected even in a mobile communication network having a wireless zone where a communication state is unstable.

F: Sixth Embodiment

Description will be next given of a communication system according to a sixth embodiment of the present invention with reference to the drawings.

F-1: Configuration of Communication System

Figure 17:
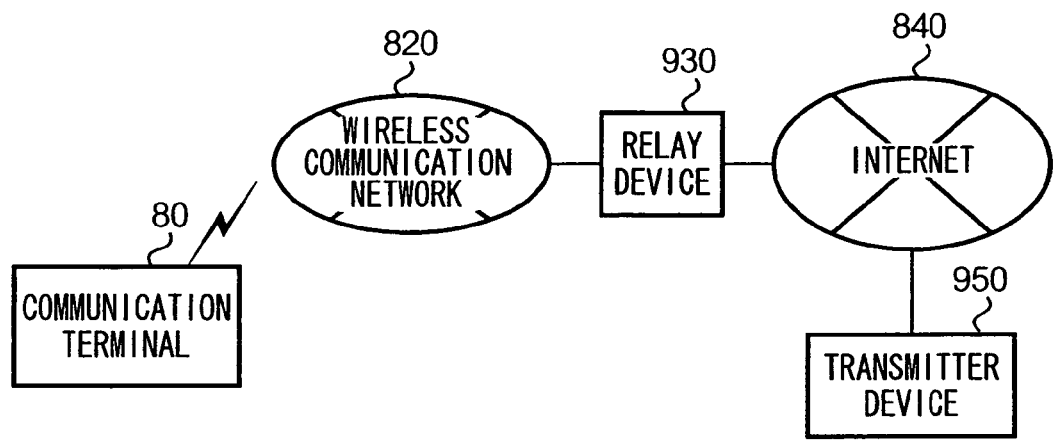
FIG. 17 is a diagram showing an example of a configuration of a communication system according to a sixth embodiment of the present invention.

FIG. 17 is an example of a communication system according to a sixth embodiment of the present invention. The communication system shown in FIG. 17 differs from the communication system shown in FIG. 13; relay device 830 is replaced with relay device 930 and transmitter device 850 is replaced with transmitter device 950.

Transmitter device 950 differs from transmitter device 850 in that transmitter device 950 transmits content by performing window control in a predetermined mode (e.g. a predetermined initial window size) upon receiving a content transmission request. That is, transmitter device 950 is a conventional transmitter device transmitting content by performing window control. Detailed description of transmitter device 950, therefore, is omitted.

Relay device 930 differs from relay device 830 in that relay device 930, when it receives a segment (i.e., a segment containing a divided portion of content to be transmitted to communication terminal 80) transmitted from transmitter device 950, identifies a data size of the content based on data written in a predetermined area (e.g. "Content-Length) of the segment, and performs window control in a mode corresponding to the identified data size to transmit the segment to communication terminal 80. In the following, description will be given with focus on relay device 930 that has characteristics particular to the present invention.

F-2: Configuration of Relay Device 930

Figure 18:
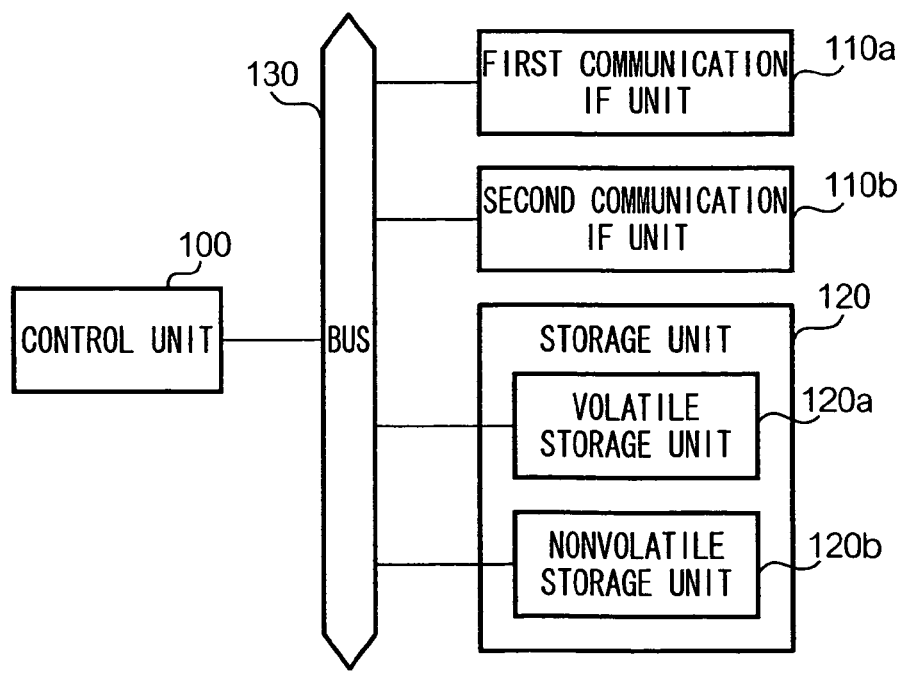
FIG. 18 is a diagram showing an example of a configuration of a relay device 930.

FIG. 18 is a diagram showing an example of a configuration of relay device 930. As shown in FIG. 18, the configuration of relay device 930 differs from that of transmitter device 850 (refer to FIG. 14) in that communication IF unit 110 is replaced with a first communication IF unit 110*a* and a second communication IF unit 110*b*.

First communication IF unit 110*a* is connected to wireless communication network 820, receives data transmitted through wireless communication network 820, passes the data over to control unit 100, and transmits data received from control unit 110 to wireless communication network 820. Second communication IF unit 110*b* is connected to the Internet 840, receives data transmitted through the Internet 840, passes the data over to control unit 100, and transmits data received from control unit 100 out to the Internet 840. In the present embodiment, while a communication IF for performing communication through wireless communication network 820 is provided separately from a communication IF for performing communication through the Internet 840, a single hardware module having a combined function can be provided instead.

Figure 19:
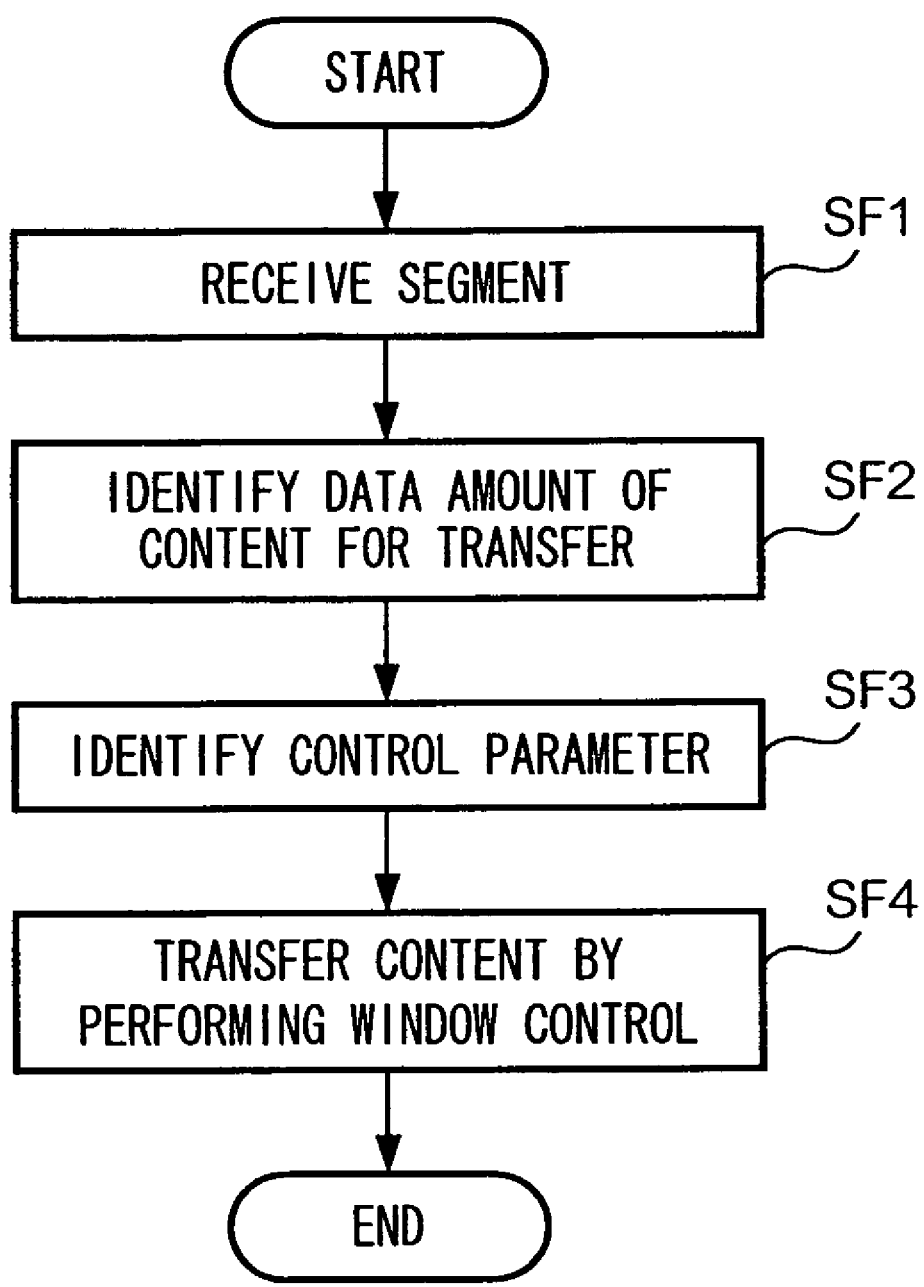
FIG. 19 is a flowchart showing a flow of a relay process performed by control unit 100 of relay device 930.

Data stored in nonvolatile storage unit 120*b* of relay device 930 is different from that stored in nonvolatile storage unit 120*b* of transmitter device 850 in the following two points. First, content is not stored in nonvolatile storage unit 120*b* of relay device 930. This is because relay device 930 transfers content transmitted from transmitter device 950 to communication terminal 80, and therefore need not store content. Second, relay software for causing control unit 100 to perform a relay process shown in FIG. 19 is stored instead of the segment transmission software. In the following, description will be given of functions provided to control unit 100 by executing software stored in nonvolatile storage unit 120b.

When relay device 930 is turned on, control unit 100 executes and runs OS software from nonvolatile storage unit 120b in the same way as transmitter device 850 does. Control unit 100 operating according to the OS software is provided with the same functions as those for transmitter device 850. When execution of the OS software is completed, control unit 100 running under the OS immediately executes and runs the relay software from nonvolatile storage unit 120b.

Control unit 100 operating according to the relay software is imparted the following three functions. The first function is a function of receiving a segment transmitted through the Internet 840. The second function is a function of identifying, based on data written in a predetermined area (Content-Length in the present embodiment) of a segment received by the receiving function, a data amount of content, and further identifying, based on the identified data amount and the control parameter management table (refer to FIG. 15), a control parameter showing a mode of window control to be performed in transmitting the content. The third function is a function of transferring the segment to a destination communication terminal 80 by performing window control in a mode designated by a control parameter identified by the third function. As described above, a control parameter stored in the control parameter management table represents an initial window size, and therefore, in the present embodiment, an initial window size for transmitting the content is identified by the identifying function, to thereby transmit the content with the identified initial window size as an initial value for performing window control.

As described above, a hardware configuration of relay device 930 is the same as that of a general computer device, and functions particular to a relay device of the present invention are imparted to such a general computer device by causing control unit 100 to execute various software stored in storage unit 120. In the present embodiment, the functions are imparted to a computer device by using software modules, but hardware modules having the same functions as those of the software modules can be used to configure relay device 930.

F-3: Operation of Relay Device 930

Description will be now given of an operation performed by relay device 930 with reference to FIG. 19. FIG. 19 is a flowchart showing a flow of a relay process performed by control unit 100 operating according to the relay software. As shown in the figure, control unit 100 of relay device 930, when it receives a segment by means of the second communication IF unit 110b (Step SF1), interprets the segment to identify a data amount of content to be transmitted to communication terminal 80 (Step SF2). Specifically, control unit 100 identifies data written in a predetermined area (Content-Length, in the present embodiment) of the segment received in Step SF1 as being a data amount of the content.

Control unit 100 then identifies a control parameter (an initial window size, in the present embodiment) based on the data amount identified in Step SF2 and details of data stored in the control parameter management table (refer to FIG. 15), the identified control parameter designating a mode of window control to be performed when transferring content (Step SF3). Specifically, in a case where the data amount identified in Step SF2 is equal to or larger than 50 kbytes, control unit 100 identifies a value of the initial window size as being "3"; and in a case where the data amount identified in Step SF2 is less than 50 kbytes, control unit 100 identifies a value of the initial window size as being "10". Control unit 100 then transfers the segment received in Step SF1 by performing window control with an initial window size identified in Step SF3 (Step SF4). As in the foregoing, the same effects as attained in the fifth embodiment are attainable by using relay device 930 of the sixth embodiment.

In the present embodiment, a segment received in Step SF1 is transmitted as it is in Step SF4. However, it is also possible to provide a storage area (hereinafter, cache area) for storing a segment received in Step SF1 in volatile storage unit 120a (or in nonvolatile storage unit 120b), so that a received segment is temporarily stored in the cache area and then transmitted in Step SF4. In this way, it becomes possible to accommodate at relay device 930 a difference in transmission rate between wireless communication network 820 and the Internet 840. In this way, even when a transmission rate in wireless communication network 820 is significantly slower than that of the Internet 840, the number of segments flowing into wireless communication network 820 can be adjusted to the transmission rate of the network 820, whereby congestion in wireless communication network 820 can be avoided.

G: Modifications

In the foregoing, description has been given of preferred embodiments of the present invention. However, modifications such as described in the following can be made to each of the above embodiments.

G-1: Modification 1

In each of the above embodiments, it is assumed that an advertisement window size notified from communication terminal 10 is sufficiently large that a transmission window size always corresponds to a congestion window size. However, the congestion window size can be always set as a transmission window size instead of setting either one of an advertisement window size or a congestion window size which is smaller; that is, an initial window size identified by the identifying function or a result obtained by a predetermined algorithm with the identified initial window size as an initial value is always used as a transmission window size.

G-2: Modification 2

In each of the above embodiments, an initial window size representing a transmission rate is used as a control parameter designating a mode of window control to be performed in transmitting content to communication terminal 10 or 80. However, the control parameter is not limited to an initial window size, but can be, for example, data showing an amount of a congestion window size (or a transmission window size) increased when it is incremented when an acknowledgment is received. Even when such a modification is made, an appropriate transmission rate for transmitting content can be determined depending on a model type of a communication terminal to receive content or on a data amount of content to be transmitted to a communication terminal. Further, the control parameter is not limited to data representing a transmission rate for transmitting content; other types of data, for example, data showing availability of various options such as window Scale option and Timestamp option or data showing availability of various algorithms such as ECN (Explicit Congestion Notification), can also be handled. Thus, it becomes possible to perform window control by adding an option or using an algorithm that is appropriate for a model type of a communication terminal which is to receive content or for a data amount of content to be transmitted to a communication terminal.

G-3: Modification 3

In the above embodiments, a control parameter showing a mode of window control to be performed when transmitting content to communication terminal 10 is identified based on a model type of a communication terminal 10 which is a designated recipient of content. Similarly, in the above fifth and sixth embodiments, a control parameter showing an initial window size (i.e., a transmission rate) is identified depending on a data amount of content to be transmitted to communication terminal 80. However, a control parameter can be determined by additionally or alternatively considering other communication conditions such as availability of wireless communication network 20 or 820 serving communication terminal 10 or 80, or a degree of load placed on a relay device 30 (or relay device 230, 330, 430, 830, or 930) detected by a detection means provided at transmitter device 50 (or transmitter device 250, 350, 850, or 950). Specifically, when wireless communication network 20 or 820 is subject to heavy use or when relay device 30 (or relay device 230, 330, 430, 830, or 930) is experiencing a large load, a control parameter can be set for a slow transmission rate. Thus, it becomes possible to prevent wireless communication network 20 or 820 or relay device 30 (or relay device 230, 330, 830, or 930) becoming congested.

G-4: Modification 4

In each of the above first to fourth embodiments, a communication address assigned to each communication terminal is used as a type identifier for uniquely identifying a model type of communication terminal 10. However, such a type identifier is not limited to a communication address assigned to communication terminal 10 but can be data showing a model type of a communication terminal or data showing a datalink (a W-CDMA network or a PDC network) used by a communication terminal. Specifically, such data showing a type identifier can be written in a predetermined area (e.g. User Agent or Reserved Area) of a content transmission request when the request is transmitted by communication terminal 10, and such data of type identifiers can be stored in the control parameter management table in place of communication addresses. Thus, the same effects can be attained as are attainable in each of the above first to fourth embodiments.

G-5: Modification 5

In the first embodiment, transmitter device 50 is caused to identify a model type of a communication terminal 10 based on a type identifier contained in a content transmission request transmitted from the communication terminal 10. Transmitter device 50 then identifies a control parameter showing a mode of window control to be performed when transmitting content to communication terminal 10 based on the identified model type of the communication terminal 10 and details of data stored in the control parameter management table. However, communication terminal 10 can transmit a content transmission request after writing the control parameter in the request, and a transmitter device which has received the content transmission request can be caused to perform window control in a mode designated by the control parameter contained in the content transmission request. Specifically, each communication terminal stores a control parameter, for each datalink used by the terminal, the control parameter designating a mode of window control to be used when transmitting data to the terminal. A communication terminal is then caused to identify, based on the details of stored data and a datalink which the terminal is using, a control parameter. The identified control parameter is then written in a content transmission request before transmission. When such a communication terminal is used, a transmitter device need not store the control parameter table. The same communication terminal can be used also in the second and third embodiments.

G-6: Modification 6

In each of the above embodiments, software is stored in advance in volatile storage unit 120b so that a transmitter device or a relay device can perform functions particular to the present invention. However, it is also possible to store the segment transmission software or the relay software in a computer readable recording medium such as CD-ROM (Compact Disk Read Only Memory), by using such a recording medium, the above software can be installed on a general computer device. Thus, a transmitter device or a relay device in an existing communication system can be provided with the same functions as those provided to the transmitter device or the relay device of the present invention.

The invention claimed is:

1. An apparatus comprising:

a data server including a memory configured to store data, the data server configured to intercommunicate with a relay device and a communication terminal through a communication network, wherein the data server is configured to store a control management parameter table including control parameters, and wherein each of the control parameters corresponds to a communication condition related to data transmission, and wherein each control parameter defines a mode of window control;

the data server is further configured to receive, through said communication network, a communication message from the communication terminal, wherein the communication message includes a request for the data stored in the memory and a communication terminal type identifier that specifies a model type of the communication terminal;

in response to the request for the data received from the communication terminal, and prior to transmission of the data to the communication terminal, the data server is further configured to determine a data transmission communication condition associated with the communication terminal, wherein the communication transmission condition includes the communication terminal type identifier of the communication terminal;

in response to the determination of the data transmission communication condition associated with the communication terminal, the data server is further configured to select a selected control parameter from among the control parameters stored in the control management parameter table as a function of the communication condition, wherein the selected control parameter includes an attribute used to control a window size for the mode of window control; and the data server is further configured to perform a mode of window control based upon the selected control parameter to transmit the data to the communication terminal.

2. The apparatus of claim 1, wherein the data transmission communication condition is further based upon a rate of data transmission to the communication terminal;

wherein the selected parameter corresponds to a first data transmission rate for the rate of data transmission; and wherein the data server is configured to detect a load placed on the communication network; and in response to detection of a high degree of load on the communication network, the data server is further configured to select a new control parameter from the control parameter management table to replace the selected control parameter, wherein the new control parameter corresponds to a second data transmission rate for the rate of data transmission; and wherein the second data transmission rate is less than the first data transmission rate.

3. A method for communicating over the network comprising:

receiving from a communication terminal, with a relay device, a request for data message directed towards a data server, wherein the request for data message includes a model type of the communication terminal and specifies requested data;

determining, with the relay device, a communication terminal type identifier that specifies a type of communication terminal based upon a content of the request for data message;

in response to determination of the communication terminal type identifier, selecting, with the relay device, a control parameter that defines a mode of window control to be performed during data transmission through a communication network to the communication terminal based upon the communication terminal type identifier, wherein the control parameter includes an attributed used to control a window size for the mode of window control; and controlling, with the relay device, the transmission of the requested data specified in the request for data message to the communication terminal as the function of the mode of window control defined by the control parameter by:

sending, with the relay device, the request for data message to the data server;

receiving, at the relay device, the requested data from the data server; and performing, with the relay device, the mode of window control based upon the attribute used to control the window size for the mode of window control to send the requested data to the communication terminal.

4. A transmitter device comprising:

a processor in communication with a memory and a communication interface, wherein the communication interface is configured to be in communication with a communication terminal through a communication network;

the memory is configured to store data to be transmitted to the communication terminal;

the memory is further configured to store a control management parameter table including control parameters, wherein each of the control parameters corresponds to a communication condition associated with the communication terminal, and wherein each control parameter defines a mode of window control;

the communication interface is further configured to receive a request for data message from the communication terminal that specifies requested data to be sent to the communication terminal, and wherein the request for data message further includes a model type of the communication terminal;

in response to the request for data message received from the communication terminal, and prior to transmission of the requested data to the communication terminal, the processor is configured to analyze the request for data message to determine a data transmission characteristic associated with the communication terminal, wherein the data communication characteristic includes a type of communication terminal to receive the requested data;

the processor is further configured to select a selected control parameter from among the control parameters of the control management parameter table based upon the data communication characteristic, wherein the selected control parameter includes an attribute used to determine a window size for the mode of window control; and the processor is further configured to control the communication interface to perform a mode of window control to transmit the requested data to the communication terminal based upon the selected control parameter selected from among the control parameters of the control management table.

5. The transmitter device of claim 4, wherein the selected control parameter includes information that defines a transmission rate for transmission of the requested data to the communication terminal.

6. The transmitter device of claim 5, wherein the selected control parameter corresponds to a first transmission rate;

wherein the processor is configured to detect a load placed on the communication network, and wherein in response to detection of a high degree of load on the communication network, the processor is further configured to select a new control parameter from among the parameters stored in the control parameter management table based upon the high degree of load placed on the communication network, wherein the new control parameter corresponds to a second transmission rate; and wherein the second transmission rate is less than the first transmission rate.

7. A relay device for controlling a transmission through a network between a terminal device and a data server, the relay device comprising:

a memory configured to store a control parameter management table including control parameters, wherein each of the control parameters corresponds to a data transmission characteristic of at least one of a plurality of communication terminals, wherein each of the control parameters defines a mode of window control to be performed during data transmission through a communication network to each respective communication terminal;

a communication interface in communication with a processor and configured to be in communication with the communication network, wherein the communication interface is further configured to communicate with a destination communication terminal of the plurality of communication terminals and a transmitter device to facilitate transfer of requested data from the transmitter device to the destination communication terminal;

the communication interface is further configured to receive, from the destination communication terminal, a request for data message for the requested data, wherein the processor is configured to determine a model type of the destination communication terminal based upon a content of the request for data message;

the processor is further configured to select a control parameter from among the control parameters of the control parameter management table as a function of the model type of the destination communication terminal, and the selected control parameter includes an attribute for used to determine a window size for the mode of window control; and the processor is further configured to direct at least one of the transmitter device and the communication interface of the relay device to transmit the requested data via the communication network to the destination communication terminal based upon the mode of window control defined by the selected control parameter.

8. The relay device of claim 7, wherein:

the memory further comprises a cache memory configured to store the requested data to be transmitted to the destination communication terminal; and the processor is further configured to transfer the requested data stored in the cache to the destination communication terminal, via the communication network, by performing the mode of window control defined by the control parameter.

9. The relay device of claim 7, wherein the processor is further configured to insert the selected control parameter into the request for data message, and thereafter relay the request for data message containing the selected control parameter to the transmitter device.

10. A system for communication between a transmitter device and a terminal device on a network comprising:
   a relay device and a data server configured to intercommunicate via a communication network, the relay device including a control parameter management table, wherein the control parameter management table includes a plurality of initial window size parameters, wherein each of the initial window size parameters defines a mode of window control to be performed during data transmission of data through the communication network;
   the relay device is further configured to receive a request for data message that specifies requested data to be sent through the communication network to a communication terminal, wherein the relay device is further configured to determine a model type of the communication terminal based upon the request for data message;
   the relay device is further configured to select an initial window size parameter from the control parameter management table as a function of the model type of the communication terminal; and
   the relay device is further configured to direct at least one of the relay device and the data server to control transmission of data requested to the communication terminal as a function of the mode of window control defined by the initial window size parameter.

11. The apparatus of claim 1, wherein the attribute used to control the window size for the mode of window control includes an initial window size attribute; and
   wherein to perform the mode of window control based upon the selected control parameter to transmit the data to the communication terminal, the data server is configured to perform the mode of window control based upon the initial window size attribute.

12. The apparatus of claim 1, wherein the attribute for determining the window size for the mode of window control includes a window size increment attribute; and
   wherein to perform the mode of window control based upon the selected control parameter to transmit the data to the communication terminal, the data server is configured to perform the mode of window control based upon the window size increment attribute.

13. The method of claim 3, wherein the attribute used to control the window size for the mode of window control includes an initial window size attribute; and
   wherein performing, with the relay device, the mode of window control based upon the attribute used to control the window size for the mode of window control to send the requested data to the communication terminal comprises:
   controlling the window size for the mode of window control based upon the initial window size.

14. The method of claim 3, wherein the attribute for determining the window size for the mode of window control includes a window size increment attribute; and
   wherein performing, with the relay device, the mode of window control based upon the attribute used to control the window size for the mode of window control to send the requested data to the communication terminal comprises:
   changing the window size for the mode of window control based upon the window size increment attribute.

15. The transmitter device of claim 4, wherein the attribute used to control the window size for the mode of window control includes an initial window size attribute; and
   wherein to control the communication interface to perform the mode of window control to transmit the requested data to the communication terminal based upon the selected control parameter, the processor is configured to control the window size for the mode of window control based upon the initial window size attribute.

16. The transmitter device of claim 4, wherein the attribute for determining the window size for the mode of window control includes a window size increment attribute; and
   wherein to control the communication interface to perform the mode of window control to transmit the requested data to the communication terminal based upon the selected control parameter, the processor is configured to change the window size for the mode of window control based upon the window size increment attribute.

17. The relay device of claim 7, wherein the selected control parameter for determining the window size for the mode of window control includes an initial window size; and
   wherein to direct the at least one of the transmitter device and the communication interface of the relay device to transmit the requested data via the communication network to the destination communication terminal based upon the mode of window control defined by the selected control parameter comprises:
   the processor configured to direct the at least one of the transmitter device and the communication interface of the relay device to transmit the requested data based upon the initial window size.

18. The relay device of claim 7, wherein the attribute for determining the window size for the mode of window control includes a window size increment attribute; and
   wherein to direct the at least one of the transmitter device and the communication interface of the relay device to transmit the requested data via the communication network to the destination communication terminal based upon the mode of window control defined by the selected control parameter comprises:
   the processor configured to direct the at least one of the transmitter device and the communication interface of the relay device to transmit the requested data based upon the window size increment attribute.

* * * * *